US008403506B2

(12) United States Patent
Suzuki

(10) Patent No.: US 8,403,506 B2
(45) Date of Patent: Mar. 26, 2013

(54) PROJECTOR PROBING METHOD, CONTROL DEVICE, AND STORAGE MEDIUM

(75) Inventor: Naoki Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 12/877,379

(22) Filed: Sep. 8, 2010

(65) Prior Publication Data

US 2011/0066259 A1    Mar. 17, 2011

(30) Foreign Application Priority Data

Sep. 15, 2009 (JP) ................................ 2009-213533

(51) Int. Cl.
*G03B 21/00* (2006.01)
(52) U.S. Cl. ............. 353/121; 353/69; 353/94; 353/70; 353/122; 345/204; 348/564
(58) Field of Classification Search .................... 353/31, 353/69, 70, 94, 121, 122; 348/563–564; 345/204, 55, 690; 700/83
See application file for complete search history.

(56) References Cited

U.S. PATENT DOCUMENTS

| | | | |
|---|---|---|---|
| 6,733,138 B2 * | 5/2004 | Raskar | 353/94 |
| 6,932,481 B2 * | 8/2005 | Koyama et al. | 353/94 |
| 7,684,376 B2 * | 3/2010 | Akaiwa | 370/338 |
| 7,701,452 B2 * | 4/2010 | Fujiwara | 345/204 |
| 8,130,824 B2 * | 3/2012 | Okada et al. | 375/240.01 |
| 8,289,454 B2 * | 10/2012 | Hasegawa et al. | 348/687 |
| 2003/0058252 A1 * | 3/2003 | Matsuda et al. | 345/589 |
| 2006/0033890 A1 * | 2/2006 | Hasegawa | 353/94 |
| 2006/0253488 A1 | 11/2006 | Akaiwa | |
| 2008/0297740 A1 * | 12/2008 | Huynh et al. | 353/94 |
| 2009/0195758 A1 * | 8/2009 | Sobel et al. | 353/69 |
| 2009/0262243 A1 * | 10/2009 | Negi et al. | 348/564 |

FOREIGN PATENT DOCUMENTS

JP    A-2006-196946    7/2006

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A method of probing a projector performed on a projector system including a plurality of projectors and a control device adapted to control at least one of the projectors, the method includes the steps of: wherein the projectors, storing information indicative of time when the projector is powered on; and transmitting the information indicative of the time to the control device; and wherein the control device, probing the projectors to obtain the information indicative of the time when the projector is powered on; identifying the projector with the latest time when the projector powered on among the plurality of projectors based on the information indicative of the time, and displaying the identification information of the projector identified.

17 Claims, 6 Drawing Sheets

FIG. 5

| PROJECTOR NAME | POWER-ON TIME | INSTALLATION LOCATION |
|---|---|---|
| EMP2484F | 11:38:05 | UNREGISTERED |
| EMP2800FA | 10:45:28 | MEETING SPACE D (CEILING MOUNT) |
| EMP287014 | 9:32:45 | MEETING SPACE B (CEILING MOUNT) |
| EMP287066 | 8:25:31 | MEETING SPACE A (CEILING MOUNT) |

PROBING PROJECTOR

FOLLOWING PROJECTORS WERE DETECTED.
SELECT PROJECTOR TO BE CONNECTED.

PROBE
CONNECT

FIG. 6

| PROJECTOR NAME | POWER-ON TIME | INSTALLATION LOCATION |
|---|---|---|
| ☑ EMP2484F | 11:38:05 | UNREGISTERED |
| ☐ EMP2800FA | 10:45:28 | MEETING SPACE D (CEILING MOUNT) |
| ☐ EMP287014 | 9:32:45 | MEETING SPACE B (CEILING MOUNT) |
| ☐ EMP287066 | 8:25:31 | MEETING SPACE A (CEILING MOUNT) |

PROBING PROJECTOR

CONNECTING...

[PROBE]
[CONNECT]

US 8,403,506 B2

PROJECTOR PROBING METHOD, CONTROL DEVICE, AND STORAGE MEDIUM

CROSS REFERENCE

The entire disclosure of Japanese Patent Application No. 2009-213533, filed Sep. 15, 2009 is expressly incorporated herein by reference.

BACKGROUND

1. Technical Field

The present invention relates to a projector system composed of a plurality of projectors and a control device such as a personal computer (PC) for controlling the projectors configured to be able to communicate with each other, the control device constituting the projector system, the projector constituting the projector system, and a storage medium on which the program to be executed by the control device in the projector system is recorded.

2. Related Art

In the case of connecting projectors and a PC configured to be able to communicate with each other via wireless communication means such as a wireless LAN to each other, there is known a method of establishing the connection by launching connection software in the PC to probe connectable projectors, and then selecting a desired projector in the projectors detected by the probe. For example, according to the method described in JP-A-2006-196946 (Document 1), the electrical field intensity of a probe request signal from a probing PC is raised gradually to increase the range of the probe, while listing the projectors sending the response.

However, in the probing system of the Document 1, since it is difficult to fine-tune the electrical field intensity of the wireless signal, in the case in which no projector is detected with certain electrical field intensity, when a further probe is then performed with increased electrical field intensity, a plurality of projectors may sometimes be detected. Therefore, in such a case, it is hard to find out which one of the listed projector is the projector (e.g., a close-by projector) desired to be connected, and the user is required to select the projector desired to be connected using other information (e.g., a model number) as a clue.

SUMMARY

According to an aspect of the invention, there is provided a method of probing a projector performed on a projector system including a plurality of projectors and a control device adapted to control at least one of the projectors, the method including the steps of, wherein the projectors, storing information indicative of time when the projector is powered on; and transmitting the information indicative of the time to the control device; and wherein the control device, probing the projectors to obtain the information indicative of the time when the projector is powered on; identifying the projector with the latest time when the projector powered on among the plurality of projectors based on the information indicative of the time, and displaying the identification information of the projector identified.

Generally, in the case of using a projector in a meeting room, the projector is powered on immediately before use in most cases. Therefore, the projector to be used from now is usually the projector powered on most lately. According to the projector system of the aspect of the invention, since it is possible to identify the projector with the latest power-on time using the power-on time as a clue, and display the identification information of the projector, the projector to be used from now can more surely be identified and then displayed by the control device.

In the method described above, further includes the steps of: wherein the control device, generating a list of the identification information of the projector tabulated in a descending order of the time when the projector is powered on, and displaying the list thus generated. Therefore, since the user can select the projector to be used from now while referring to the list having the projector powered on most lately in the top portion thereof, the projector the user desires to use can easily be identified.

Further, in the method described above, wherein the control device, displaying the time when the projector is powered on in correspondence with the identification information of the projector. Therefore, the user can more surely identify the projector the user desires to use while checking the display of the power-on time.

Further, in the method described above, wherein the projectors, the information transmitted further includes content regarding an installation location of the projector, and wherein the control device, displaying the installation location in correspondence with the identification information of the projector. Therefore, the user can more surely identify the projector the user desires to use while checking the display of the information indicative of the installation location of the projector.

Further, in the method described above, further includes the steps of, wherein the control device, transmitting an information request requesting the information to two or more of the projectors, wherein the projectors, transmitting the information to the control device in response to reception of the information request. Therefore, since the user can transmit the information request to the plurality of projectors after confirming that the projector the user desires to use is powered on, the user can more surely identify the projector the user desires to use as the projector with the latest power-on time.

Further, in the method described above, further includes the steps of, wherein the control device, broadcasting a probe request for probing connectable ones of the projectors, and wherein the projectors, transmitting the information to the control device in response to reception of the probe request. Therefore, it is possible to make the projectors transmit the information described above including the time when each of the projectors is powered on to the control device using the probe request broadcasted from the control device as a trigger.

According to another aspect of the invention, there is provided a control device having a configuration capable of communicating with a plurality of projectors, including a communication section adapted to probe the projectors to obtain the information indicative of time when the projector is powered on, an identification section adapted to identify the projector with the latest time when the projector powered on among the plurality of projectors based on the information indicative of the time, and a display section adapted to display identification information of the projector identified.

According to still another aspect of the invention, there is provided a projector having a configuration capable of communicating with a control device, including a storage section adapted to store information indicative of time when the projector is powered on, and a transmission section adapted to transmit the information to the control device.

Further, according to yet another aspect of the invention, there is provided a computer readable storage medium storing a program executed by a control device having a display section and configured to be capable of communicating with a plurality of projectors, the program making the control device perform a method including the steps of (a) probing the projectors to obtain information indicative of time when the projector is powered on, (b) identifying the projector with the latest time when the projector powered on among the plurality of projectors based on the information, and (c) making the display section display identification information of the projector identified.

BRIEF DESCRIPTION OF THE DRAWINGS

The invention will be described with reference to the accompanying drawings, wherein like numbers reference like elements.

FIG. 5 is a diagram showing an example of a screen display of the PC display section 52 in the process for specifying and then connecting the projector desired to be used.

FIG. 6 is a diagram showing an example of a screen display of the PC display section 52 in the process for specifying and then connecting the projector desired to be used.

DESCRIPTION OF AN EXEMPLARY EMBODIMENT

Although an embodiment of the invention will hereinafter be explained based on the accompanying drawings, the embodiment described below does not limit the scope of the invention as recited in the appended claims, and all of the combinations of the features in the embodiment are not necessarily essential to the solution of the invention.

Figure 1:
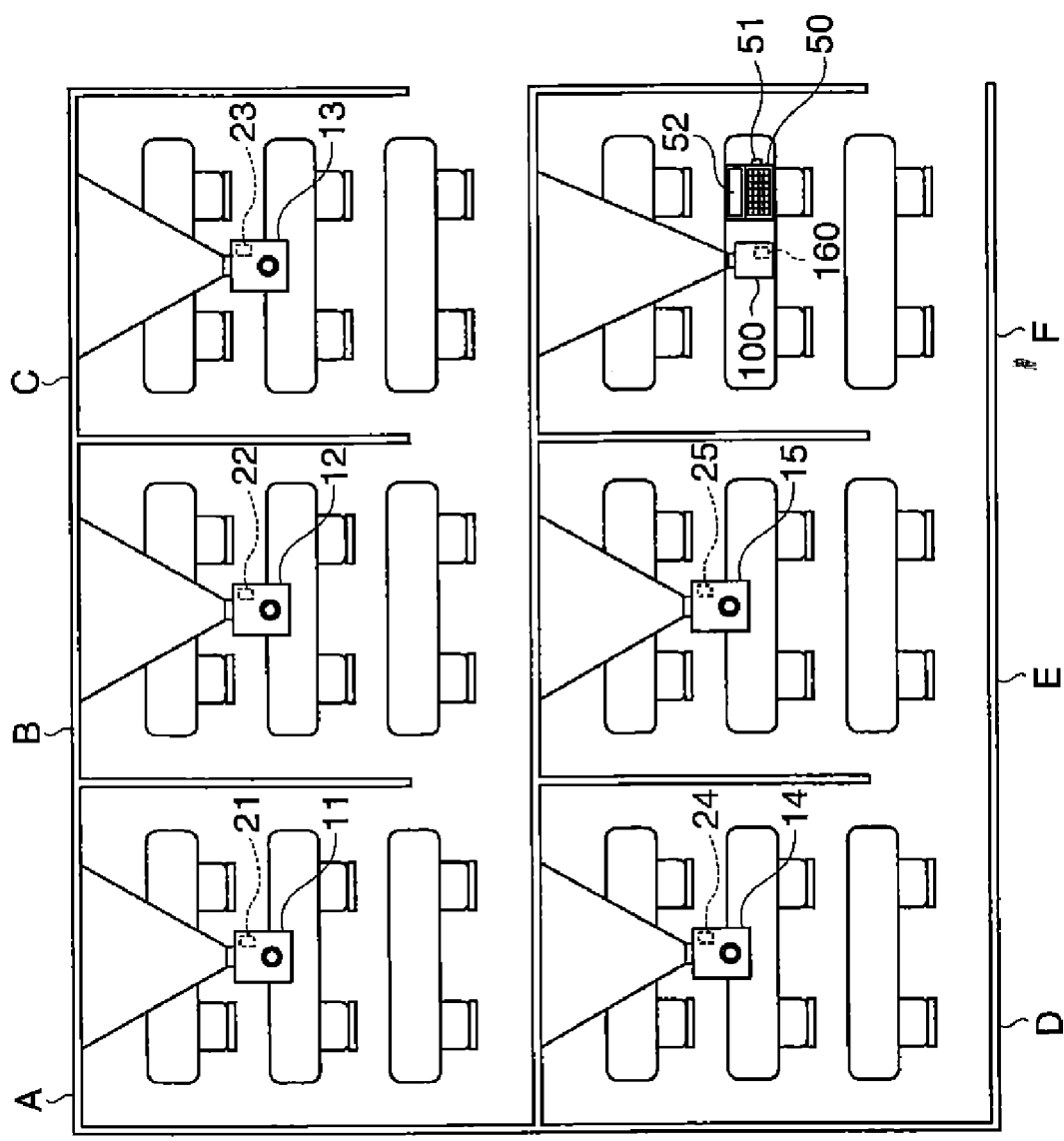
FIG. 1 is a diagram of meeting spaces to which a projector system according to an embodiment of the invention is disposed viewed from above.

FIG. 1 is a diagram of meeting spaces to which a projector system according to the embodiment of the invention is disposed viewed from above. The projector system according to the present embodiment is provided with projectors 11, 12, 13, 14, and 15 mounted on the ceilings of the meeting spaces A through E out of the partitioned meeting spaces A through F. These projectors 11 through 15 are respectively provided with communication sections 21, 22, 23, 24, and 25 capable of communicating via a wireless LAN. Further, the projectors 11 through 15 can wirelessly communicate data with a control device such as a personal computer (PC) brought into the meeting spaces A through E, to which the projectors 11 through 15 are installed respectively, using the respective communication sections 21 through 25 via an access point (not shown).

Further, the projector system according to the present embodiment includes a projector 100 brought into the meeting space F and a PC 50 brought into as the control device of the projector 100. The projector 100 has a communication section 160 capable of communicating via a wireless LAN. The communication section 160 includes a transmission section in the invention. The PC 50 is a notebook personal computer, and includes a PC communication section 51, and a PC display section 52 as a liquid crystal panel capable of performing color display. It should be noted that the PC communication section 51 corresponds to a communication section in the invention, and the PC display section 52 corresponds to a display section in the invention. The projectors 11, 12, 13, 14, 15, and 100 installed in or brought into the respective meeting spaces A through F are capable of projecting pictures such as presentation materials on the screens disposed on the wall surfaces of the respective meeting spaces.

It should be noted that the communication sections 21 through 25, and 160, and the PC communication section 51 are each a wireless LAN card compliant with at least either one of the wireless LAN standards such as IEEE 802.11a, IEEE 802.11b, or IEEE 802.11g. Further, the communication sections 21 through 25 and 160 are an example of the transmission sections in the invention, and the PC communication section 51 is an example of a reception section, an information request transmission section, and a probe request transmission section in the invention. Further, the PC display section 52 is an example of a display section in the invention.

Figure 2:
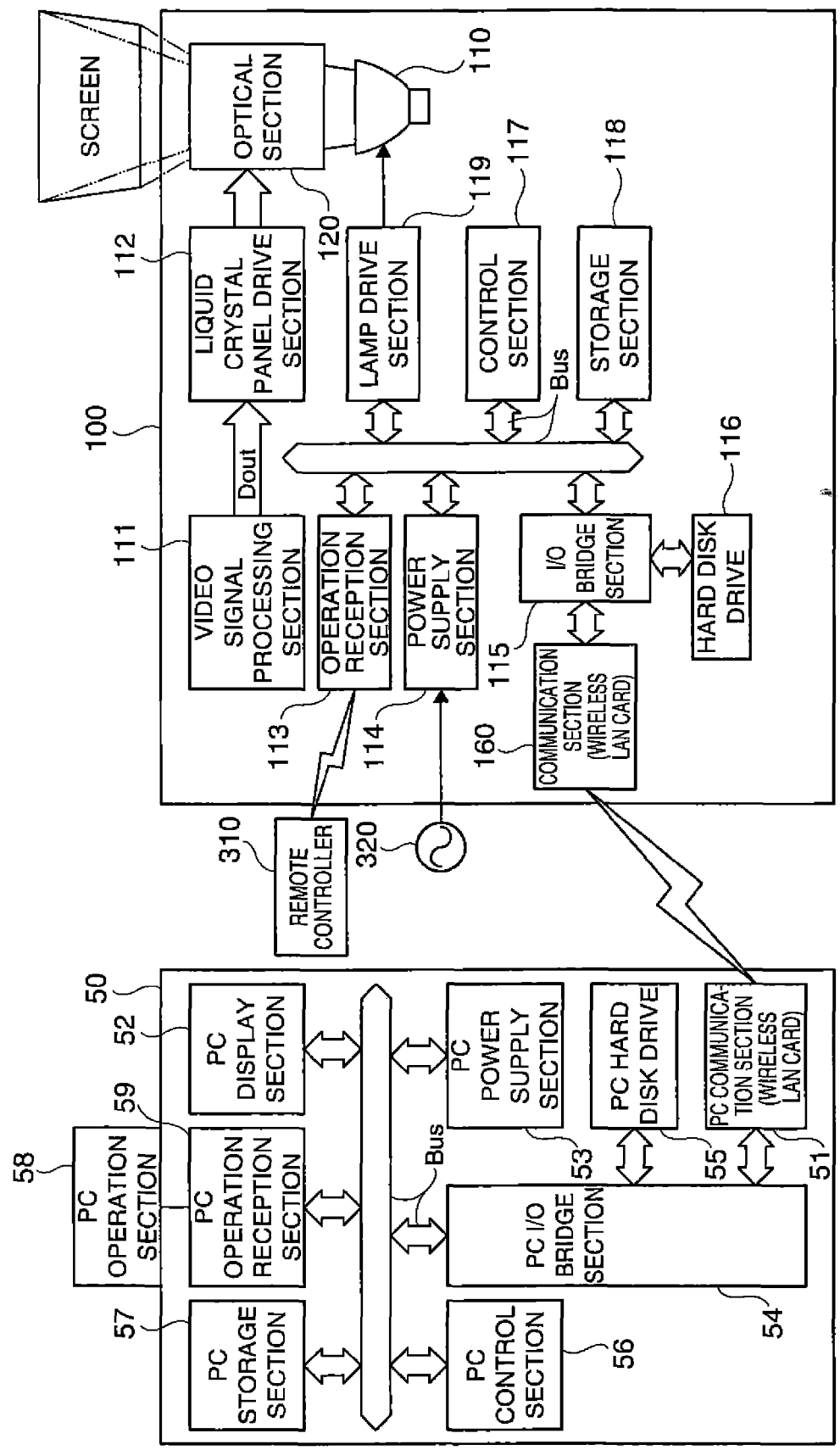
FIG. 2 is a schematic configuration diagram of a projector 100 and a PC 50.

FIG. 2 is a schematic configuration diagram of the projector 100 and the PC 50. Since the projectors 11 through 15, and the projector 100 are provided with substantially the same configurations although different in model number, the configuration of the projector 100 will be explained as a representative of these projectors.

The projector 100 is a so-called "tri LCD projector," which separates the light emitted by the lamp 110 as a light source into light's three primary colors (red light, blue light, and green light), modulates the respective colored light components by liquid crystal light valves for the respective colored light components as light modulating elements included in an optical section 120 in accordance with a video signal from the PC 50, recomposes them, and then projects them on the screen.

The projector 100 is provided with an operation panel (not shown) disposed on the top panel of the main body of the projector 100, the operation panel having a plurality of operation buttons for operating the projector 100. It should be noted that instead of the operation panel described above, the projectors 11 through 15 mounted on the ceilings of the respective meeting spaces A through E are each remote-controlled by a remote controller 310 provided with a plurality of operation buttons similar to the operation panel.

The projector 100 is mainly composed of a lamp 110, a video signal processing section 111, a liquid crystal panel drive section 112, an operation reception section 113, a power supply section 114, an I/O bridge section 115, a hard disk drive 116, a control section 117, a storage section 118, a lamp drive section 119, and an optical section 120 in addition to the communication section 160 described above. The storage section 118 corresponds to a storage section in the invention.

The lamp 110 is a discharge lamp capable of providing high brightness such as a high-pressure mercury lamp, a metal halide lamp, or a halogen lamp. The video signal processing section 111 performs various kinds of video signal processing described later on the video signal supplied from the PC 50 via the communication section 160. In order for making the video signal suitable to be displayed by the liquid crystal light valves, the video signal processing section 111 performs the video signal processing such as writing of the video data included in the video signal into a video memory (not shown) or reading thereof in a predetermined condition, and then outputs the result as a digital video signal Dout. The video signal processing includes, for example, a scaling process for expanding and shrinking the image expressed by the video signal to thereby match the image with the resolution the liquid crystal light valves have, a keystone correction for correcting the keystone distortion caused in accordance with the angle formed between the optical axis of the projection lens and the screen, and so on.

The liquid crystal panel drive section 112 performs a predetermined image processing on the video signal Dout input from the video signal processing section 111 to thereby convert the video signal into an analog drive voltage, then supplies the drive voltage to the liquid crystal light valves (not shown) together with various synchronizing clock signals, and thus makes the liquid crystal light valves display the image. The image processing performed by the liquid crystal panel drive section 112 includes a γ-correction process for converting the grayscale values included in the video signal into the grayscale values suitable to be displayed by the liquid crystal light valves, a color shading correction process for correcting the color shading inherent to the liquid crystal light valves, and so on. When the operation section such as the remote controller 310 is operated, the operation reception section 113 sends an operation signal functioning as a trigger to various operations to the control section 117 in response to the operation. The power supply section 114 introduces the alternating current power from an external power supply 320 via a plug, and supplies each section of the projector 100 with a direct current voltage, which is stabilized by processes such as voltage transformation, rectification, and smoothing performed by an AC/DC converter section (not shown) incorporated therein.

The I/O bridge section 115 is loaded with various device controllers such as a card controller compliant with Personal Computer Memory Card International Association (PCMCIA) for controlling the wireless LAN card of the communication section 160 and an Integrated Drive Electronics (IDE) controller for controlling the hard disk drive 116.

The hard disk drive 116 is a hard disk drive compliant with IDE, and stores programs such as a browser for browsing web pages and a variety of plug-ins for adding reproduction functions for audio-visual (AV) data including video and audio signals to the browser. Thus, the projector 100 is capable of storing the AV data downloaded from the Internet, for example, via the communication section 160 into the hard disk drive 116, and then reproducing the AV data alone and projecting the images.

The control section 117 is a central processing unit (CPU), and communicates signals with each section via a bus line Bus. For example, when the communication section 160 receives an information request or a probe request described later, the control section 117 makes the communication section 160 transmit identification information such as an IP address for identifying the projector 100, and the information indicating the time when the projector is powered on last carried on the response signal. Further, it is also possible for the control section 117 to make the communication section 160 transmit the information including the content indicating the place where the projector 100 is installed. The information described above is stored in the storage section 118, and is appropriately updated by the control section 117.

The storage section 118 is composed mainly of a nonvolatile memory device for rewritably storing data such as a flash memory. The storage section 118 stores various programs and corresponding data for controlling the operation of the projector 100 such as start-up routines used when starting up the projector 100, and various protocol programs for performing communication by the communication section 160. It should be noted that these programs and the corresponding data can be stored in the hard disk drive 116. The lamp drive section 119 is provided with an igniter circuit supplied with the power from the power supply section 114 and for generating a high voltage for turning on the lamp 110 as a discharge lamp to thereby form a discharge path, and a ballast circuit (neither shown) for maintaining the stable lighting state after turning on the light.

The optical section 120 is configured including an integrator optical system for converting white light emitted by the lamp 110 into substantially parallel light with a stable luminance distribution, a separation optical system for separating the white light with a stable luminance distribution into the colored light components of red, green, and blue, the light's three primary colors, and supplying them to the liquid crystal light valves for the respective colored light components, and a combination optical system (neither shown) for recombining the respective colored light components modulated by the liquid crystal light valves for the respective colored light components in accordance with the drive voltages corresponding to the video signal Dout. The optical section 120 projects a full-color image on the screen using the projection light obtained by magnifying the full-color substantially parallel modulated light output from the combination optical system using the projection lens incorporated therein.

A schematic configuration of the PC 50 will hereinafter be explained. The PC 50 is composed mainly of a PC power supply section 53, a PC I/O bridge section 54, a PC hard disk drive 55, a PC control section 56, a PC storage section 57, a PC operation section 58, and a PC operation reception section 59 in addition to the PC communication section 51 and the PC display section 52 described above. It should be noted that in order for distinguishing from the names of the constituents of the projector 100, the names of the constituents of the PC 50 are each attached with "PC."

The PC communication section 51 transmits the probe request for probing the connectable projectors in a broadcast manner. Further, the PC communication section transmits the information request for requesting the identification information described above and the information of the latest power-on to the plurality of projectors 11 through 15, and 100. Then, the PC communication section 51 receives the response signals from the connectable projectors.

The PC power supply section 53 is, for example, a rechargeable lithium-ion battery, and stores the electrical power supplied from the external power supply, and supplies each section of the PC 50 with the direct current voltage. The PC I/O bridge section 54 is a south bridge, and is loaded with various device controllers such as the card controller compliant with PCMCIA for controlling the PC communication section 51 (the wireless LAN card) and the IDE controller for controlling the PC hard disk drive 55.

The PC hard disk drive 55 is, for example, a hard disk drive compliant with IDE, and stores programs such as an operating system (OS) as basic software, a browser, and various kinds of business software used for word processing or presentations.

The PC control section 56 is an example of an identifying section and a list generation section in the invention, and is realized by a Central Processing Unit (CPU), and controls communication of signals with each section and the operation of each section via bus line Bus. For example, the PC control section 56 executes various programs for controlling the operation of the PC such as a probing program for performing probing of the connectable projectors, a connection program for connecting the PC to the projector selected by the user among the projectors thus detected, and various kinds of protocol programs for performing communication by the PC communication section 51.

Further, in the case in which a plurality of connectable projectors are detected when performing the probe described above, the PC control section 56 retrieves, from the PC storage section 57 described later, the identification information such as an IP address for identifying the projector and the information indicating the time when the projector is powered on last included in the response signal from each of the projectors, and then generates a list of the identification information of the projectors tabulated in a descending order of the power-on time based on the information. Further, on this occasion, the PC control section 56 identifies the projector with the latest power-on time, and puts it at the top of the list.

The PC storage section 57 is an example of a storage section in the invention, and is composed mainly of a non-volatile memory device for rewritably storing data such as a flash memory. The PC storage section 57 stores various programs for controlling the operation of the PC 50 such as programs executed by the PC control section 56 and the corresponding data and so on. It should be noted that these programs and the corresponding data can be stored in the PC hard disk drive 55.

Further, the PC storage section 57 stores the information described above included in the response signal described above received by the PC communication section 51. More specifically, the PC storage section 57 stores the information included in the response signal transmitted from the connectable projector when performing the probe described above. Further, the PC storage section 57 stores the list described above generated by the PC control section 56 when the plurality of connectable projectors is detected. It should be noted that in the present embodiment, there is a setting that when the probing program is executed, the content of the list generated based on the result of the previous probe is deleted.

The PC display section 52 displays the identification information of the projector identified as the projector with the latest power-on time. Further, the PC display section 52 displays the list described above generated by the PC control section 56 in the case in which the plurality of connectable projectors is detected when performing the probe described above. On this occasion, in addition to the identification information of the listed projectors, the PC display section 52 displays the time when each of the projectors is powered on in correspondence with the identification information. Further, it is also possible that in the case in which the information includes the content indicating the place where the projector is installed, the PC display section 52 displays the content in correspondence with the identification information of the respective projectors.

The PC operation section 58 corresponds to a keyboard and a mouse, and various operations such as for starting up and shutting down the PC 50, and displaying materials for presentations are performed thereon. When the PC operation section 58 is operated, the PC operation reception section 59 sends an operation signal functioning as a trigger to various operations to the PC control section 56 in response to the operation.

Figure 3:
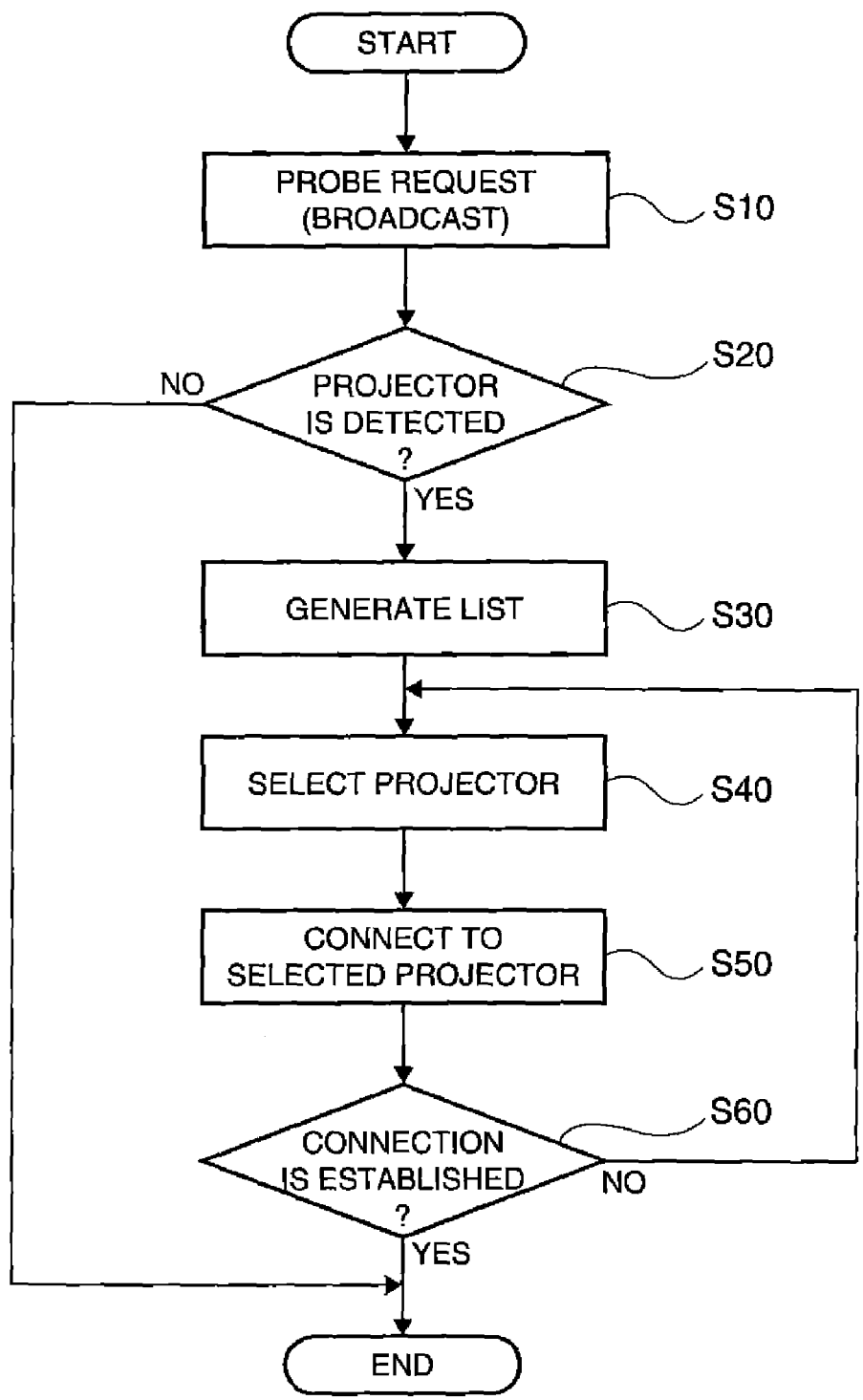
FIG. 3 is a flowchart showing a process for specifying and then connecting the projector desired to be used.
Figure 4:
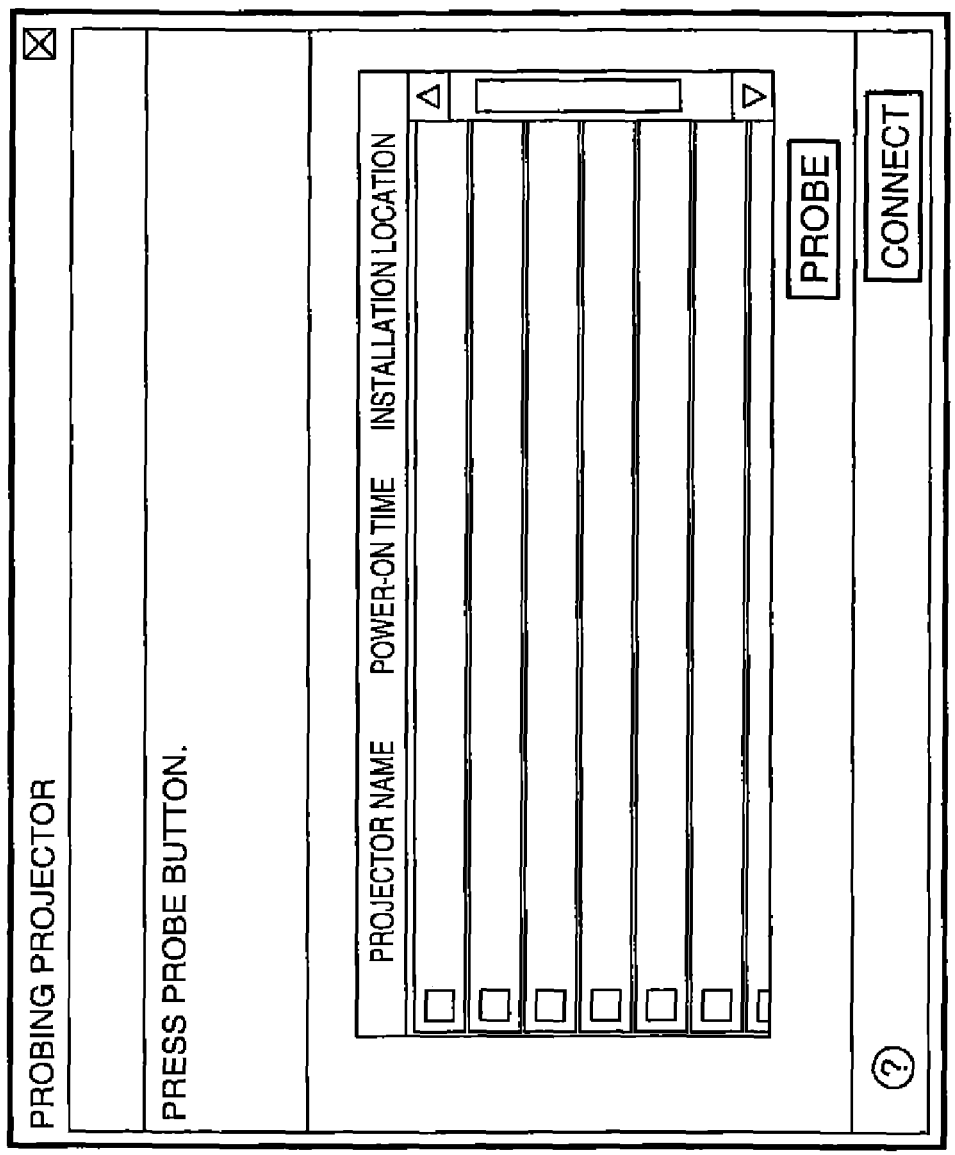
FIG. 4 is a diagram showing an example of a screen display of a PC display section 52 in the process for specifying and then connecting the projector desired to be used.

FIG. 3 is a flowchart showing a process for specifying and then connecting the projector desired to be used. FIGS. 4 through 6 are diagrams showing an example of a screen display of the PC display section 52 in the process for specifying and then connecting the projector desired to be used. Hereinafter, an example of an operation flow in the projector system according to the present embodiment from the probe of the connectable projectors to the establishment of the connection to the projector the user desires to use will be explained along the flowchart shown in FIG. 3. Further, on this occasion, the explanation will be presented with reference to the content of the screen display of the PC display section 52 shown in FIGS. 4 through 6 if necessary.

In the present operation flow, when the user operates the PC operation section 58 firstly to thereby make the PC control section 56 execute the probing program, the screen shown in FIG. 4 is displayed on the PC display section 52. Here, when the user presses the "probe" button in the lower right portion of the screen, the PC communication section 51 of the PC 50 broadcasts (step S10) the probe request for probing the connectable projectors. Subsequently, if the PC communication section 51 receives the response signal from at least one connectable projector, namely the connectable projectors are detected (YES in step S20), the PC control section 56 of the PC 50 generates the list by tabulating the model number of each of the projectors, the time when each of the projectors powered on last, and the place where each of the projectors is installed included in the response signal from each of the projectors on a projector-by-projector basis, and then makes the PC display section 52 display the list (step S30). In the present embodiment, the model number of the projector is displayed as a "PROJECTOR NAME." It should be noted that if no connectable projector is detected (NO in step S20), the present operation flow is terminated. It should be noted that on this occasion the user is allowed to operate the present operation flow again after powering on the projector the user desires to use.

For example, in the case in which four projectors, namely the projector 100 brought into the meeting space F shown in FIG. 1, the projector 14 installed in the meeting space D, the projector 12 installed in the meeting space B, and the projector 11 installed in the meeting space A, are detected as the connectable projectors, the list having the identification information and so on tabulated from the top in a descending order of the power-on time is displayed on the PC display section 52 as shown in FIG. 5.

Subsequently, the user selects the projector the user desires to use in the list displayed on the PC display section 52, and presses (step S40) the "CONNECT" button in the lower right portion of the screen after checking the checkbox beside the model number (PROJECTOR NAME) of the selected projector. FIG. 6 shows the display screen in the case in which the user selects the projector 100 (EMP2484F) displayed on the top of the list on the ground that the projector has the latest power-on time as the projector the user desires to use. Thus, the PC control section 56 executes the connection program for connecting the PC to the selected projector, and then the trial connection to the selected projector 100 is performed (step S50).

Subsequently, if the connection to the selected projector 100 is established (YES in step S60), the present flow is terminated. On the other hand, if the connection to the selected projector 100 fails to be established (NO in step S60), it is also possible for the PC control section 56 to make the PC display section 52 display a message window saying "CONNECTION FAILED" after a predetermined time elapses from when the "CONNECT" button has been pressed. Further, on this occasion, the user selects (step S40) another projector in the list displayed on the PC display section 52, and then presses (step S50) the "CONNECT" button in the lower right portion of the screen. After then, the flow on and after the step S60 is repeated.

As described hereinabove, according to the projector system of the present embodiment, even in the case in which a plurality of projectors is detected as the connectable projector, by using the power-on time or the like as a clue, the list having the identification information of the projector with the latest time displayed on the top thereof can be generated. Further, since the projector the user plans to use from now and the projector with the latest power-on time are the same in most cases, according to the present system, the user can easily identify the projector to be used from now referring only to the projectors displayed upper part of the list.

Although the invention is hereinabove explained using the embodiment, the scope of the invention is not limited to the range of the description of the embodiment described above. It is obvious to those skilled in the art that various modifications and improvements can be added to the embodiment described above.

What is claimed is:

1. A method of probing a projector performed on a projector system, the method comprising the steps of:
    probing a plurality of projectors to obtain information indicative of time when each of the plurality of the projectors is powered on;
    receiving the information indicative of the time when each of the plurality of projectors is powered on; and
    identifying a projector with latest time when the projector powered on among the plurality of projectors based on the information indicative of the time when each of the plurality of projectors is powered on, and
    displaying identification information of the projector identified.

2. The method according to claim 1, further comprising the steps of:
    generating a list of identification information of the plurality of projectors tabulated in a descending order of the time when each of the plurality of projectors is powered on, and
    displaying the list thus generated.

3. The method according to claim 1, further comprising the step of:
    displaying the time when the identified projector is powered on in correspondence with the identification information of the identified projector.

4. The method according to claim 1,
    further comprising the step of:
        displaying an installation location in correspondence with the identification information of the identified projector.

5. The method according to claim 1, further comprising the step of:
    transmitting an information request requesting the information to two or more of the projectors.

6. The method according to claim 1, further comprising the step of:
    broadcasting a probe request for probing connectable ones of the projectors.

7. A control device having a configuration capable of communicating with a plurality of projectors, comprising:
    a communication section adapted to probe the plurality of projectors to obtain information indicative of time when each of the plurality of projectors is powered on;
    an identification section adapted to identify a projector with latest time when the projector powered on among the plurality of projectors based on the information indicative of the time when each of the projectors is powered on; and
    a display section adapted to display identification information of the projector identified.

8. The control device according to claim 7, further comprising:
    a list generation section adapted to generate a list of the identification information of the plurality of projectors tabulated in a descending order of the time when each of the projectors is powered on,
    wherein the display section displays the list thus generated.

9. The control device according to claim 7, wherein
    the display section displays the time when the identified projector is powered on in correspondence with the identification information of the identified projector.

10. The control device according to claim 7, wherein
    the information further includes content regarding an installation location of each of the plurality of projectors, and
    the display section displays the installation location in correspondence with the identification information of the identified projector.

11. The control device according to claim 7, wherein
    the communication section further includes an information request transmitting section adapted to transmit an information request requesting the information to two or more of the projectors.

12. The control device according to claim 7, wherein
    the communication section further includes a probe request transmission section adapted to broadcast a probe request for probing connectable ones of the projectors.

13. A non-transitory computer readable storage medium storing a program executed by a control device having a display section and configured to be capable of communicating with a plurality of projectors, the program making the control device perform the steps of:
    (a) probing the plurality of projectors to obtain information indicative of time when each of the plurality of projectors is powered on;
    (b) identifying a projector with latest time when the projector powered on among the plurality of projectors based on the information indicative of time when each of the plurality of projectors is powered on; and
    (c) making the display section display identification information of the projector identified.

14. The non-transitory computer readable storage medium according to claim 13, the program further making the control device perform the step of:
    (d) generating a list of identification information of the plurality of projectors tabulated in a descending order of the time when each of the plurality of projectors is powered on,
    wherein in step (c), the display section is made to display the list generated in step (d).

15. The non-transitory computer readable storage medium according to claim 13, wherein
    the information further includes content regarding an installation location of each of the plurality of projectors, and
    in step (c) the display section is made to display the installation location in correspondence with the identification information of the identified projector.

16. The non-transitory computer readable storage medium according to claim 13, wherein
    in step (a), an information request requesting the information is transmitted to two or more of the projectors.

17. The non-transitory computer readable storage medium according to claim 13, wherein
    in step (a), a probe request for probing connectable ones of the projectors is broadcasted.

* * * * *